US012574615B2

(12) United States Patent
Kim

(10) Patent No.: US 12,574,615 B2
(45) **Date of Patent: *Mar. 10, 2026**

(54) CAMERA DEVICE

(71) Applicant: LG INNOTEK CO., LTD., Seoul (KR)

(72) Inventor: Kwang Sung Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/732,265

(22) Filed: Jun. 3, 2024

(65) Prior Publication Data

US 2024/0334030 A1 Oct. 3, 2024

Related U.S. Application Data

(63) Continuation of application No. 17/418,318, filed as application No. PCT/KR2020/000344 on Jan. 8, 2020, now Pat. No. 12,035,023.

(30) Foreign Application Priority Data

Jan. 9, 2019 (KR) ........................ 10-2019-0002835

(51) Int. Cl.

*H04N 23/51* (2023.01)
*G03B 17/56* (2021.01)
*H04N 23/57* (2023.01)
*H04N 23/695* (2023.01)

(52) U.S. Cl.

CPC ........... *H04N 23/51* (2023.01); *G03B 17/561* (2013.01); *H04N 23/57* (2023.01); *H04N 23/695* (2023.01)

(58) Field of Classification Search

CPC ...... H04N 23/51; H04N 23/57; H04N 23/695; G03B 17/561; G03B 30/00; B60R 2011/0085; B60R 11/04; F16M 11/18; F16M 13/02; F16M 11/10

See application file for complete search history.

(56) References Cited

U.S. PATENT DOCUMENTS

| | | | | |
|---|---|---|---|---|
| 4,412,285 | A * | 10/1983 | Neches | H04L 69/00 719/310 |
| 2016/0318458 | A1* | 11/2016 | Wato | H04N 23/51 |

FOREIGN PATENT DOCUMENTS

| | | | |
|---|---|---|---|
| CN | 103225617 | A | 7/2013 |
| GB | 1 437 958 | A | 6/1976 |
| JP | 11-78716 | A | 3/1999 |
| JP | 2003-48491 | A | 2/2003 |
| JP | 2013-83740 | A | 5/2013 |
| KR | 10-0661051 | B1 | 12/2006 |
| KR | 20-2011-0006253 | U | 6/2011 |
| KR | 10-2011-0107536 | A | 10/2011 |
| KR | 10-2013-0015743 | A | 2/2013 |

(Continued)

*Primary Examiner* — Yosef K Laekemariam

(74) *Attorney, Agent, or Firm* — Birch, Stewart, Kolasch & Birch, LLP

(57) ABSTRACT

A camera angle adjustment device includes a bracket; a camera module disposed in the bracket; a viewing angle adjustment member having one side disposed in the bracket and the other side coupled to the camera module so as to control the position of the camera module; and an elastic member disposed in the bracket so as to bring the one side of the viewing angle adjustment member into contact with the bracket.

14 Claims, 24 Drawing Sheets

(56) References Cited

FOREIGN PATENT DOCUMENTS

| | | | |
|---|---|---|---|
| KR | 10-2016-0092819 | A | 8/2016 |
| WO | WO 2010/031208 | A1 | 3/2010 |

* cited by examiner

CAMERA DEVICE

CROSS REFERENCE TO RELATED APPLICATIONS

This application is a Continuation of U.S. application Ser. No. 17/418,318, filed on Jun. 25, 2021, which is the National Phase of PCT/KR2020/000344, filed on Jan. 8, 2020, which claims priority under 35 U.S.C. § 119(a) to Patent Application No. 10-2019-0002835, filed in the Republic of Korea on Jan. 9, 2019, all of which are hereby expressly incorporated by reference into the present application.

TECHNICAL FIELD

The present embodiment relates to a camera device.

BACKGROUND ART

In recent years, micro-camera modules have been developed, and micro-camera modules are widely used in small electronic products such as smart phones, notebook computers, and game consoles.

As automobiles become more popular among public, micro-cameras are widely used not only in small electronic products but also in vehicles. For example, a black box camera for the protection of a vehicle or objective data of a traffic accident, a rear surveillance camera that enables the driver to monitor the blind spot at the rear of the vehicle through the screen to ensure safety when the vehicle is reversing, a surrounding detection camera that can monitor the surroundings of the vehicle, and the like are provided.

Meanwhile, with the development of technology, a lane keeping assist system (LKAS) that generates an alarm after detecting a lane departure situation caused by the driver's carelessness or drowsy driving by receiving the image signal in front of the driving road and analyzing it in real time is being applied.

However, due to differences in the size of the vehicle, the angle of the windshield for each vehicle, and the like, it is necessary to use a configuration such as a separate coupler for each vehicle for the optimum view angle of the lane keeping assist system, thereby causing a problem in that the cost of the mold is incurred.

DETAILED DESCRIPTION OF THE INVENTION

Technical Subject

The problem to be solved by the present invention is to provide a camera device capable of reducing costs.

Technical Solution

A camera device according to an aspect of the present invention may comprise: a bracket; a camera module coupled to the bracket so as to be rotatable about a first axis; a view angle adjustment member including a first portion coupled to the bracket and a second portion coupled to the camera module; and an elastic member disposed on the bracket to contact the first portion of the view angle adjustment member with the bracket.

In addition, the view angle adjustment member includes a body, a thread formed in the second portion of the body, an end portion and a locking portion protruding from the first portion of the body, and the end portion of the view angle adjustment member and the locking portion may be spaced apart.

In addition, the elastic member may include a first region disposed between the end portion and the locking portion, and a second region bent in the first region and disposed between the end portion and one surface of the bracket.

In addition, the bracket includes a support portion on which the elastic member is disposed, wherein the support portion may include a first sidewall disposed between the camera module and the first portion of the view angle adjustment member, a second sidewall facing the first sidewall, and a third sidewall and a fourth sidewall connecting the first sidewall and the second sidewall.

In addition, the first sidewall includes a first opening in which a portion of the view angle adjustment member is disposed, and the second sidewall may include a second opening exposing an end of the first portion of the view angle adjustment member to the outside.

In addition, the first region of the elastic member may include a third opening corresponding to the first opening, and the second region of the elastic member may include a fourth opening corresponding to the second opening.

In addition, the camera module includes a coupling portion to which the second portion of the view angle adjustment member is coupled so that the position of the camera module is adjusted; the coupling portion of the camera module and the support portion of the bracket are spaced apart; and when the distance between the coupling portion and the support portion is increased, a distance between the upper portion of the camera module and the upper portion of the bracket may be greater than the distance between the lower portion of the camera module and the lower portion of the bracket.

In addition, the first opening may be formed to have a length in a first direction longer than a length in a second direction perpendicular to the first direction.

In addition, the elastic member may be formed in a 'U' shape.

In addition, one surface of the locking portion of the view angle adjustment member may be formed in a curved shape.

In addition, the first sidewall of the support portion may include a first groove having a curved shape corresponding to a curved shape of one surface of the locking portion.

In addition, the other side of the view angle adjustment member may be screw-coupled to the coupling portion.

In addition, a length at which the view angle adjustment member and the camera module are screw-coupled, and a rotation angle of the camera module with respect to the bracket may correspond to each other.

In addition, the end of the view angle adjustment member may be disposed between the first opening and the second opening.

In addition, the first region of the elastic member is in contact with one side of the locking portion of the view angle adjustment member to elastically support the view angle adjustment member, and the second region of the elastic member may be supported by one surface of the second sidewall of the support portion of the bracket.

In addition, the first region of the elastic member may be in line contact with the one side of the locking portion of the view angle adjustment member to fix the view angle adjustment member in a predetermined position with respect to the bracket.

In addition, the second sidewall of the support portion of the bracket includes a protrusion formed by being extended from the inner side surface to the other side, and the second region of the elastic member may be disposed between the protrusion of the bracket and a bottom surface of the support portion.

In addition, the coupling portion of the camera module may include a second groove.

In addition, it may include a loosening prevention portion disposed in the second groove and penetrated by the body of the view angle adjustment member.

In addition, the camera module may include a housing and extension portions being extended from both ends of the housing, and the extension portion may be hingedly coupled to the bracket.

The camera device according to the present embodiment comprises: a bracket; a camera module coupled to the bracket so that the view angle can be adjusted; a view angle adjustment member for adjusting a view angle of the camera module; and an elastic member for pressing the view angle adjustment member, wherein the view angle adjustment member includes a body and a locking portion being protruded from the body, wherein the bracket includes a first sidewall disposed between the locking portion and the camera module, and a second sidewall disposed on the opposite side of the first sidewall with respect to the locking portion, and wherein the elastic member may include a first region in contact with the locking portion to press the locking portion against the first sidewall, and a second region in contact with the second sidewall of the bracket.

Advantageous Effects

A camera device capable of reducing costs can be provided through the present embodiment.

BEST MODE

Hereinafter, preferred embodiments of the present invention will be described in detail with reference to the accompanying drawings.

However, the technical idea of the present invention is not limited to some embodiments to be described, but may be implemented in various forms, and within the scope of the technical idea of the present invention, one or more of the constituent elements may be selectively combined or substituted between embodiments.

In addition, the terms (including technical and scientific terms) used in the embodiments of the present invention, unless explicitly defined and described, can be interpreted as a meaning that can be generally understood by a person skilled in the art, and commonly used terms such as terms defined in the dictionary may be interpreted in consideration of the meaning of the context of the related technology.

In addition, terms used in the present specification are for describing embodiments and are not intended to limit the present invention.

In the present specification, the singular form may include the plural form unless specifically stated in the phrase, and when described as "at least one (or more than one) of A and B and C", it may include one or more of all combinations that can be combined with A, B, and C.

In addition, in describing the components of the embodiment of the present invention, terms such as first, second, A, B, (a), and (b) may be used. These terms are merely intended to distinguish the components from other components, and the terms do not limit the nature, order or sequence of the components.

And, when a component is described as being 'connected', 'coupled' or 'interconnected' to another component, the component is not only directly connected, coupled or interconnected to the other component, but may also include cases of being 'connected', 'coupled', or 'interconnected' due that another component between that other components.

In addition, when described as being formed or arranged in "on (above)" or "below (under)" of each component, "on (above)" or "below (under)" means that it includes not only the case where the two components are directly in contact with, but also the case where one or more other components are formed or arranged between the two components. In addition, when expressed as "on (above)" or "below (under)", the meaning of not only an upward direction but also a downward direction based on one component may be included.

Hereinafter, the present invention will be described in more detail with reference to the accompanying drawings.

Figure 1:
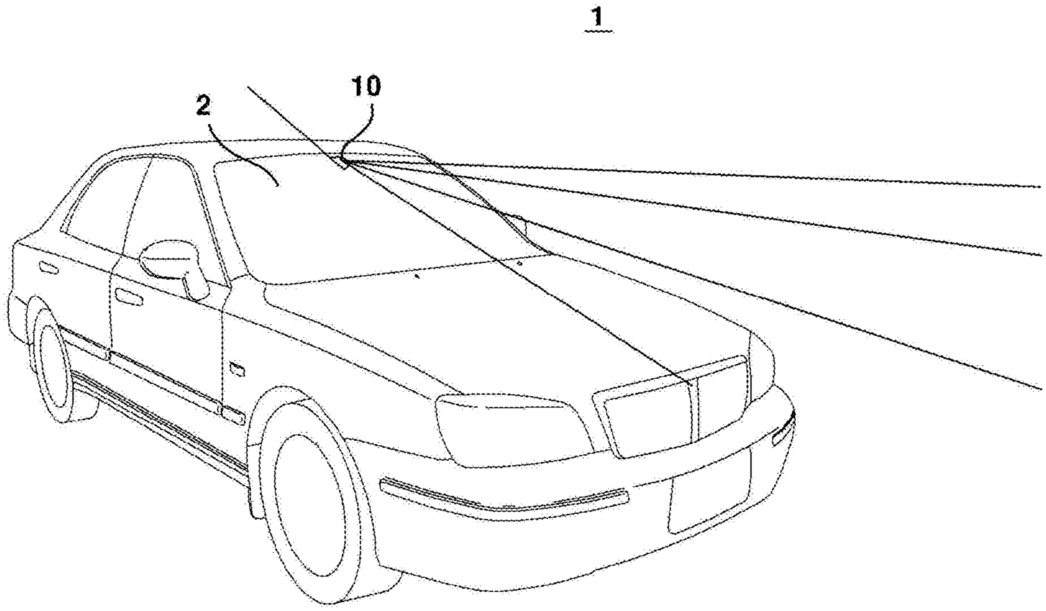
FIG. 1 is a schematic diagram of a vehicle equipped with a camera angle adjustment device according to an embodiment of the present invention.

FIG. 1 is a schematic diagram of a vehicle equipped with a camera angle adjustment device according to an embodiment of the present invention.

The camera device may include a camera angle adjustment device 10. Referring to FIG. 1, the camera angle adjustment device 10 according to an embodiment of the present invention may be coupled to a wind shield 2 of a vehicle 1. The wind shield 2 may be disposed in the front or rear of the vehicle 1. The wind shield 2 is formed of a transparent material so that the driver can look forward or rearward. The wind shield 2 may include a front wind shield disposed in front of the vehicle 1 and a rear wind shield disposed in the rear of the vehicle. The camera angle adjustment device 10 may be coupled to the inner side surface of the wind shield 2. In one embodiment of the present invention, the camera angle adjustment device 10 is described as an example that is coupled to the front wind shield, but may be coupled to the rear wind shield. The bracket 100 of the camera angle adjustment device 10 may be directly coupled to the inner side surface of the wind shield 2 by a method such as adhesion, or the camera angle adjustment device 10 may be coupled to the wind shield 2 through a separate coupler (not shown) and/or a cover (not shown).

Figure 2:
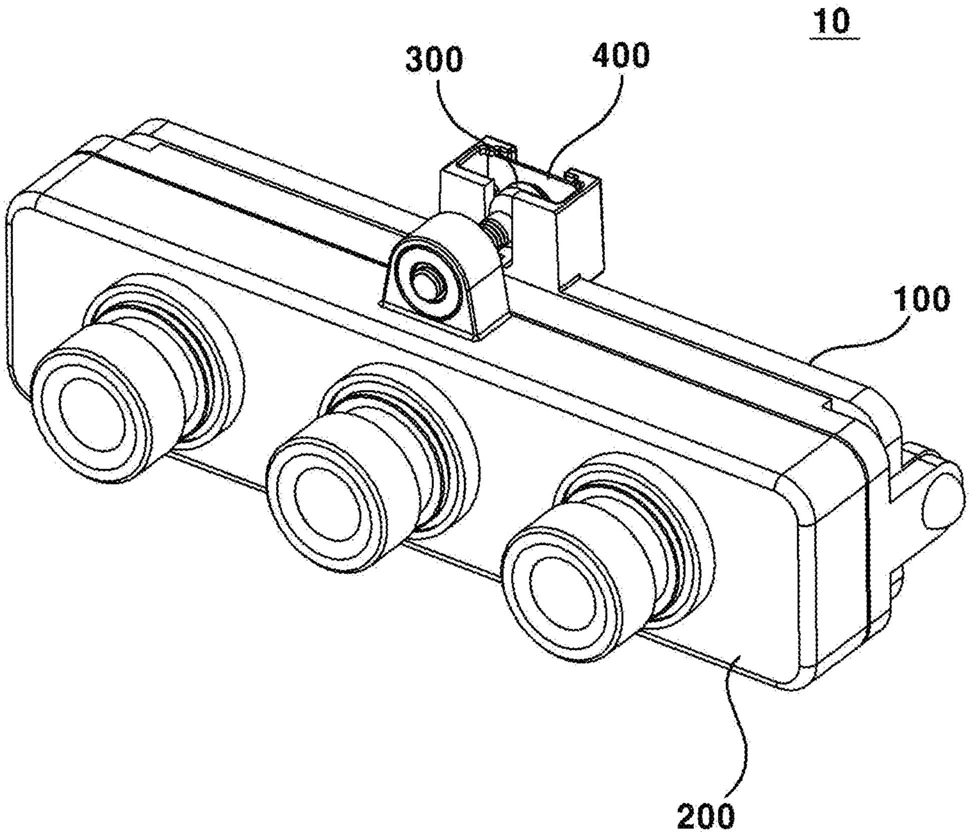
FIGS. 2 and 3 are perspective views of a camera angle adjustment device according to an embodiment of the present invention.
Figure 3:
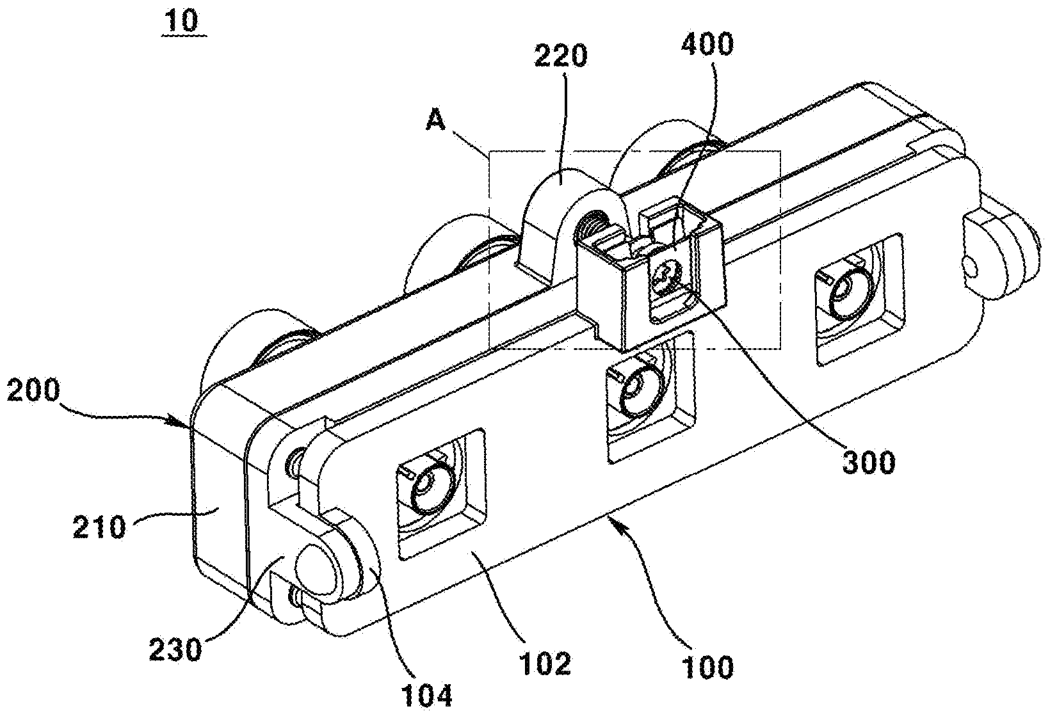
Figure 4:
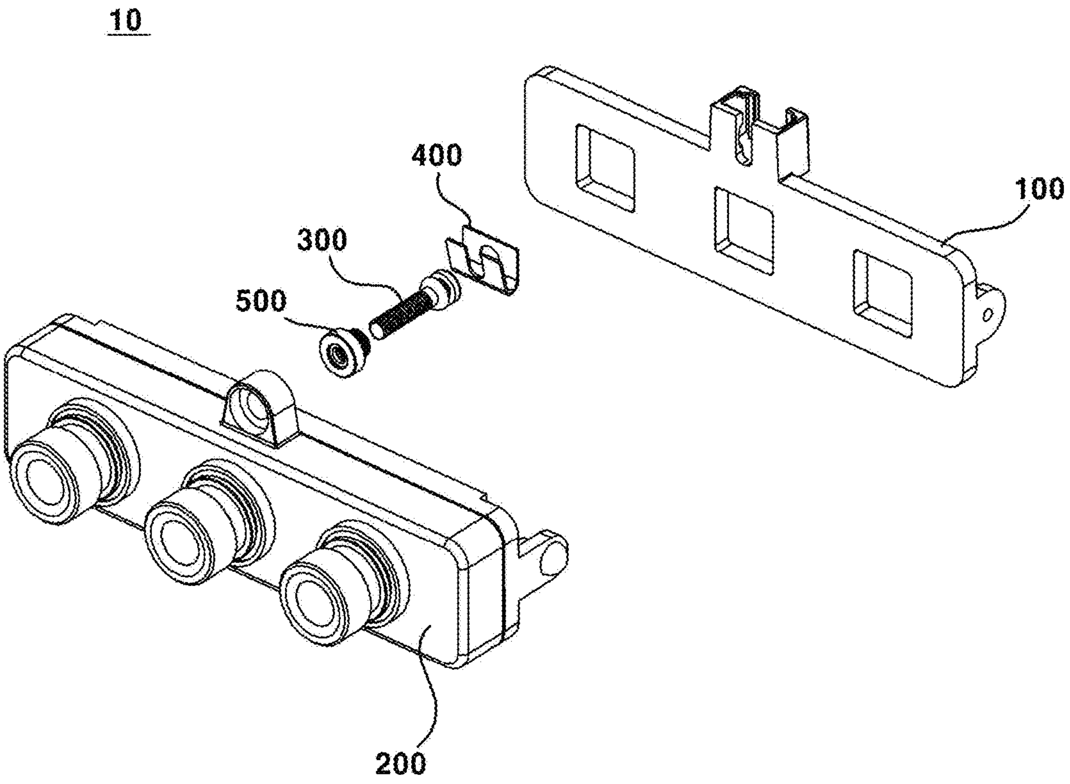
FIG. 4 is an exploded perspective view of a camera angle adjustment device according to an embodiment of the present invention.
Figure 5:
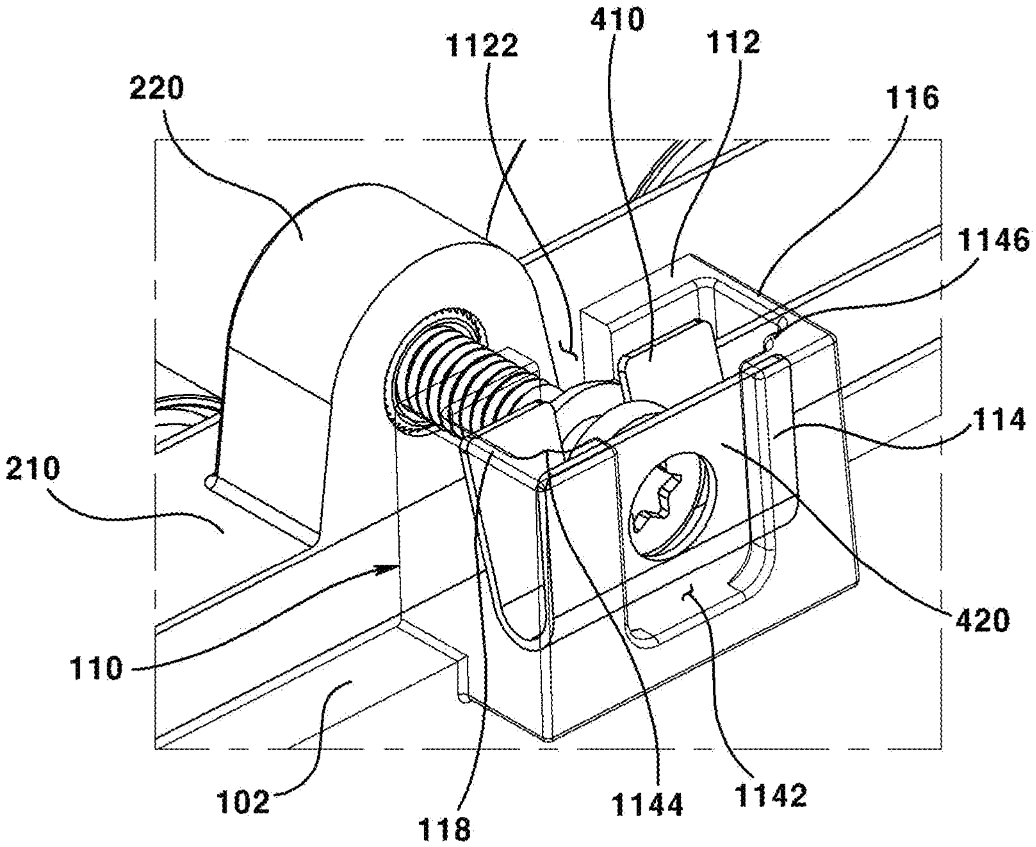
FIG. 5 is an enlarged view of part A of FIG. 3.
Figure 6:
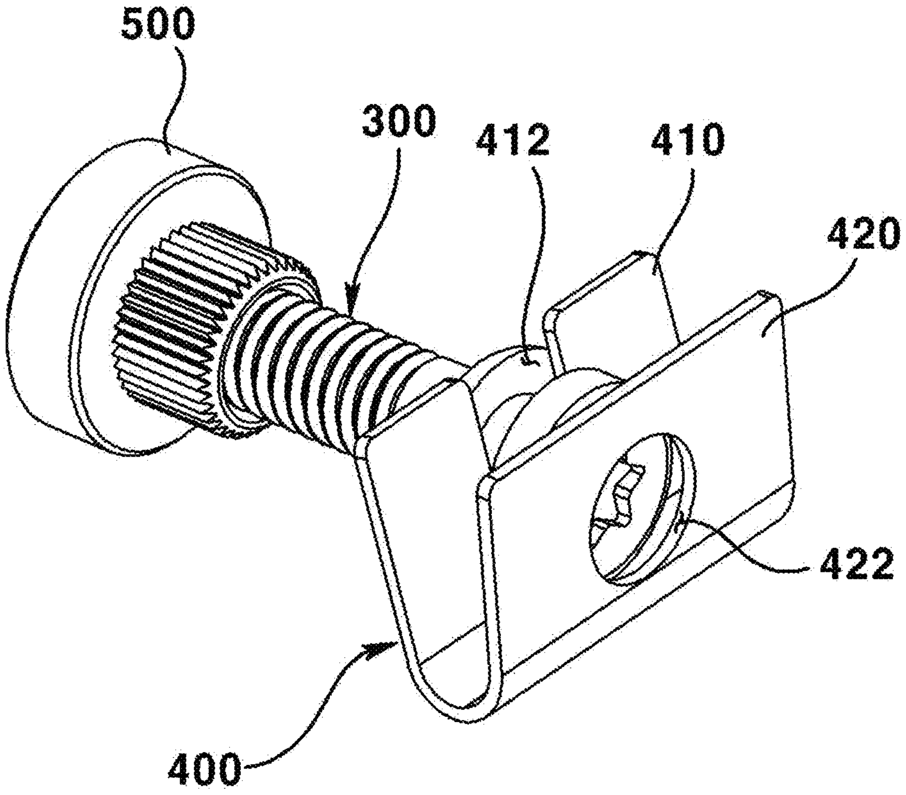
FIGS. 6 and 7 are perspective views of a view angle adjustment member, an elastic member, and a loosening prevention portion of the camera angle adjustment device according to an embodiment of the present invention.
Figure 7:
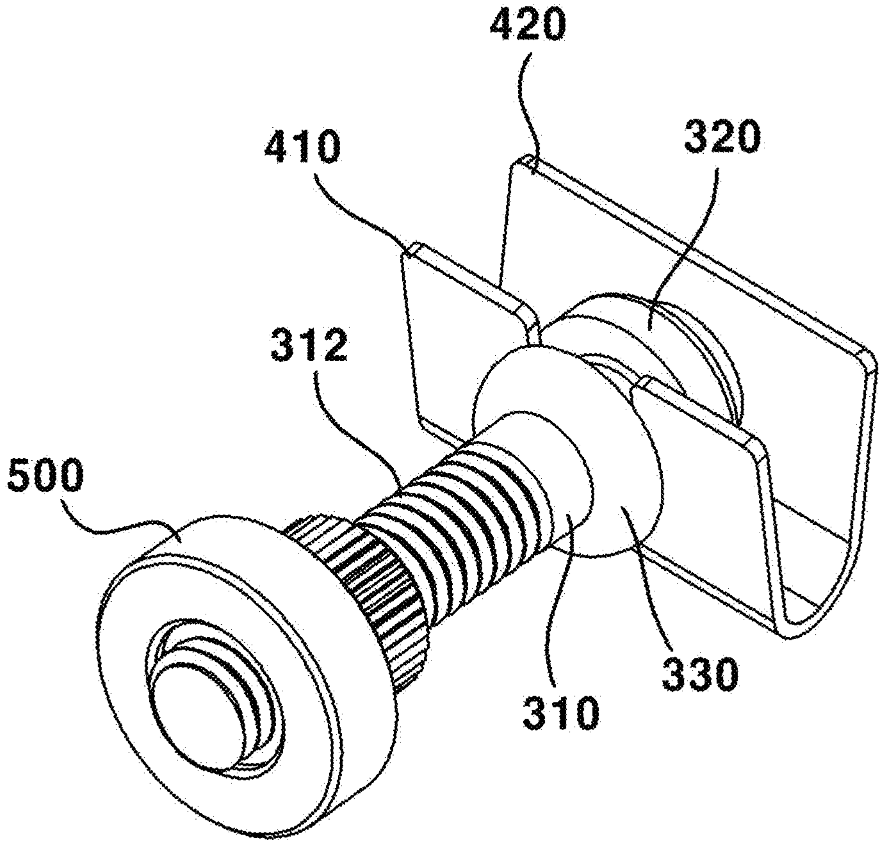
Figure 8:
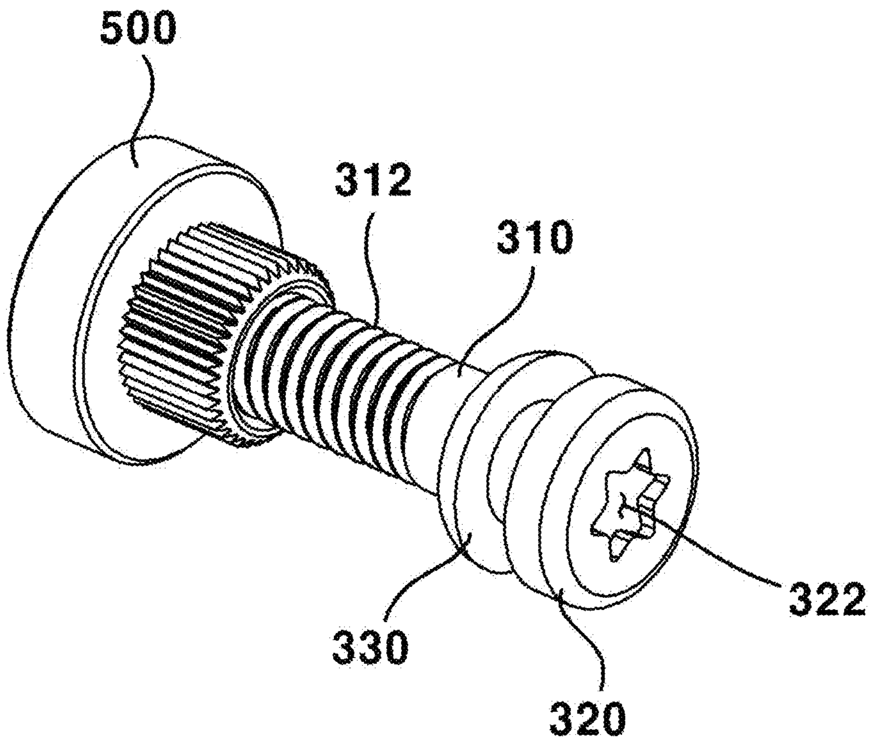
FIG. 8 is a perspective view of a view angle adjusting member and a loosening prevention portion of the camera angle adjusting device according to an embodiment of the present invention.
Figure 9:
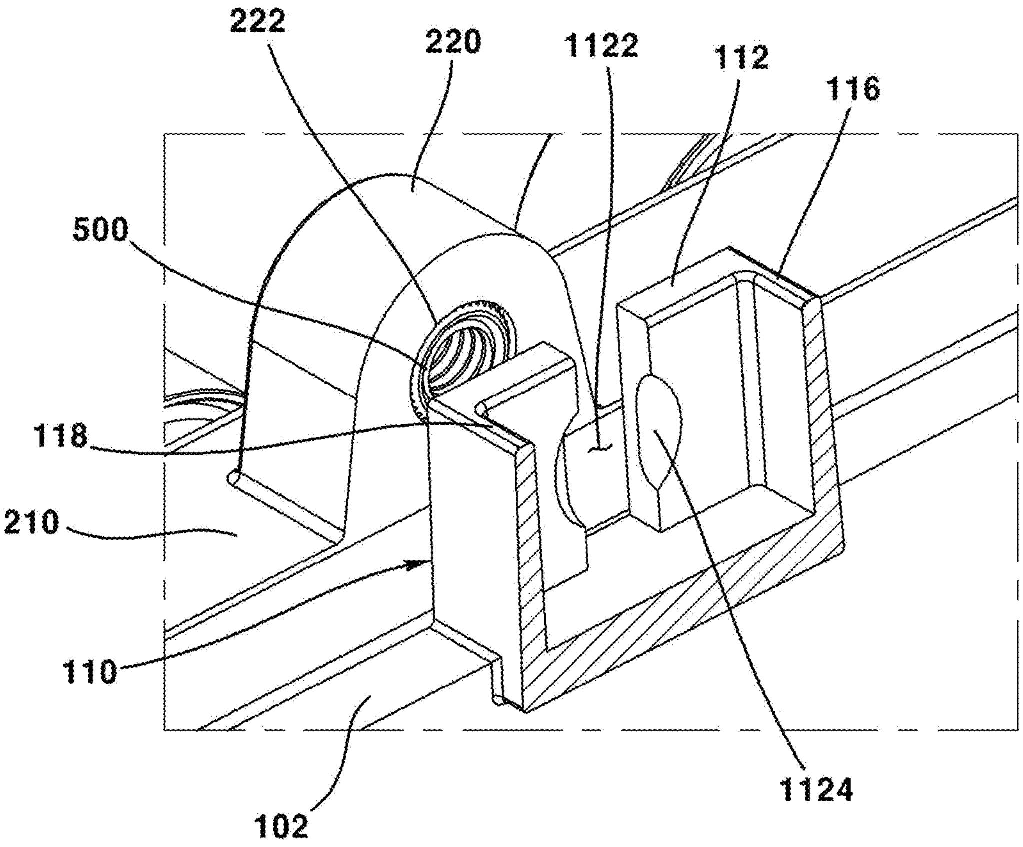
FIGS. 9 and 10 are schematic diagrams of some configurations of a camera angle adjustment device according to an embodiment of the present invention.
Figure 10:
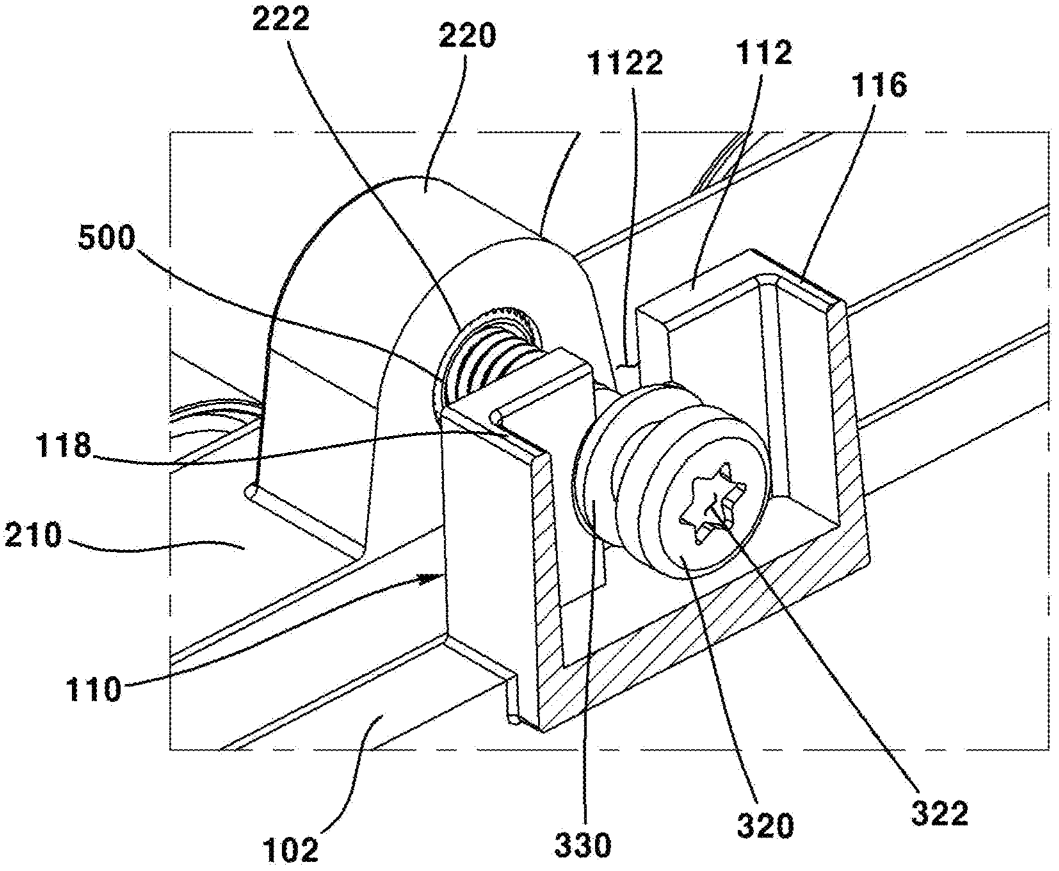

FIGS. 2 and 3 are perspective views of a camera angle adjustment device according to an embodiment of the present invention. FIG. 4 is an exploded perspective view of a camera angle adjustment device according to an embodiment of the present invention. FIG. 5 is an enlarged view of part A of FIG. 3. FIGS. 6 and 7 are perspective views of a view angle adjustment member, an elastic member, and a loosening prevention portion of the camera angle adjustment device according to an embodiment of the present invention. FIG. 8 is a perspective view of a view angle adjusting member and a loosening prevention portion of the camera angle adjusting device according to an embodiment of the present invention. FIGS. 9 and 10 are schematic diagrams of some configurations of a camera angle adjustment device according to an embodiment of the present invention.

Referring to FIGS. 2 to 10, the camera angle adjustment device 10 according to an embodiment of the present invention includes a bracket 100, a camera module 200, a view angle adjustment member 300, and an elastic member 400, and a loosening prevention unit 500 may be included, but may be implemented excluding some of the configurations, and additional configurations other than those are not excluded.

The camera angle adjustment device 10 may be installed on the wind shield 2 of the vehicle 1. The camera angle adjustment device 10 may adjust the view angle of the camera module 200. Through this, the view angle can be adjusted within the range of the view angle desired by the user by compensating for the manufacturing tolerance of the camera module 200 or the mounting tolerance on the vehicle 1.

The camera angle adjustment device 10 may include a bracket 100. The bracket 100 may be disposed on one side of the camera module 200. The bracket 100 may be disposed behind the camera module 200. The bracket 100 may be mounted on the wind shield 2 of the vehicle 1. The bracket 100 may rotatably support the camera module 200. At least a portion of the view angle adjustment member 300 and an elastic member 400 may be disposed on the bracket 100. The bracket 100 may include a body 102, an extension portion 104, and a support portion 110.

The body 102 of the bracket 100 may support the housing 210 of the camera module 200. The body 102 may be disposed on one side or the rear of the housing 210 of the camera module 200. The body 102 may be formed in a shape and size corresponding to the housing 210 of the camera module 200. Extension portions 104 are formed at both ends of the body 102 of the bracket 100, and a support portion 110 may be formed in an upper portion.

The extension portion 104 of the bracket 100 may be extended from both ends of the body 102. The extension portion 104 of the bracket 100 may be coupled with the extension portion 230 of the camera module 200. The extension portion 104 of the bracket 100 may be hinged to the extension portion 230 of the camera module 200. The extension portion 104 of the bracket 100 may rotatably support the extension portion 230 of the camera module 200. In one embodiment of the present invention, the extension portion 104 is described as an example that is formed by being extended from both ends of the body 102 to one side or rear, but is not limited thereto, and formed by being extended forward from both ends of the body 102 or may be formed by being extended in the outer circumferential direction.

The support portion 110 may be disposed in an upper portion of the body 102. The support portion 110 may be formed by being extended upward from the upper surface of the body 102. An elastic member 400 may be disposed on the support portion 110. One side of the view angle adjustment member 300 may be disposed on the support portion 110. The support portion 110 may face the coupling portion 220 of the camera module 200. The support portion 110 may be spaced apart from the coupling portion 220 of the camera module 200 by a predetermined distance. The support portion 110 may include a first sidewall 112, a second sidewall 114, a third sidewall 116, and a fourth sidewall 118. One side of the view angle adjustment member 300 may include a first portion. One side of the view angle adjustment member 300 may include a first region. The other side of the view angle adjustment member 300 may include a second portion. The other side of the view angle adjustment member 300 may include a second region.

The first sidewall 112 may be disposed between the camera module 200 and one side of the view angle adjustment member 300. The first sidewall 112 may face the coupling portion 220 of the camera module 200. The first sidewall 112 may face the second sidewall 114. The first sidewall 112 may be connected to the third sidewall 116. The first sidewall 112 may be connected to the fourth sidewall 118. The first sidewall 112 may include a first opening 1122 and a first groove 1124.

A part of the view angle adjustment member 300 may be disposed in the first opening 1122 of the first sidewall 112. The body 310 of the view angle adjustment member 300 may be disposed in the first opening 1122 of the first sidewall 112. In the first opening 1122 of the first sidewall 112, a region without thread 312 among the body 310 of the view angle adjustment member 300 may be disposed. The first opening 1122 of the first sidewall 112 may be formed to have a length in a first direction longer than a length in a second direction perpendicular to the first direction. The first opening 1122 of the first sidewall 112 may be formed to have a length in a vertical direction longer than a length in the horizontal direction. An end portion 320 of the view angle adjustment member 300 may be disposed between the first opening 1122 and the second opening 1142.

The first groove 1124 of the first sidewall 112 may be formed in a curved shape corresponding to one surface of a locking portion 330 of the view angle adjustment member 300 in the other direction. The first groove 1124 of the first sidewall 112 may be formed in a shape symmetrical with respect to the first opening 1122 of the first sidewall 112. One surface of the locking portion 330 of the view angle adjustment member 300 may be disposed in the first groove 1124 of the first sidewall 112. The size of the first groove 1124 of the first sidewall 112 may be smaller than the size of one surface of the locking portion 330 of the view angle adjustment member 300. Through this, the view angle adjustment member 300 can finely rotate with respect to the first sidewall 112, so that damage to the product can be prevented.

The second sidewall 114 may face the first sidewall 112. The second sidewall 114 may be connected to the third sidewall 116. The second sidewall 114 may be connected to the fourth sidewall 118. The second sidewall 114 may include a second opening 1142 and protrusions 1144 and 1146.

Between the second opening 1142 of the second sidewall 114 and the first opening 1122 of the first sidewall 112, the end portion 320 and the locking portion 330 of the view angle adjustment member 300 may be disposed. The second opening 1142 of the second sidewall 114 may expose an end of one side of the view angle adjustment member 300 to the outside. Specifically, the second opening 1142 of the second sidewall 114 may expose a tool groove 322 of the end portion 320 of the view angle adjustment member 300 to the outside. Through this, the user can easily change the length at which the view angle adjustment member 300 is screw-coupled with respect to the coupling portion 220 of the camera module 200 by inserting the tool into the tool groove 322 and rotating it.

The protrusions 1144 and 1146 of the second sidewall 114 may include two protrusions 1144 and 1146. The two protrusions 1144 and 1146 may be formed by being extended from the inner side surface of the second sidewall 114 facing the first sidewall 112 toward the other side or the first sidewall 112. The two protrusions 1144 and 1146 of the second sidewall 114 may be formed in a region adjacent to the edge of the first sidewall 112. The two protrusions 1144 and 1146 of the second sidewall 114 may be formed in an upper region of the second sidewall 114. A second region 420 of the elastic member 400 may be disposed between the two protrusions 1144 and 1146 of the second sidewall 114 and the bottom surface of the support portion 110. Through this, it is possible to prevent the elastic member 400 from being separated.

The third and fourth sidewalls 116 and 118 may connect the first sidewall 112 and the second sidewall 114. In a space between the third sidewall 116 and the fourth side wall 118, an end portion 320 of the view angle adjustment member 300, a locking portion 330, and an elastic member 400 may be disposed. The length or area of the third sidewall 116 and the fourth sidewall 118 may be formed to be smaller than the length or area of the first and second sidewalls 112 and 114.

The camera angle adjustment device 10 may include a camera module 200. The camera module 200 may be disposed on the bracket 100. The camera module 200 may be disposed on the other side or in front of the bracket 100. The camera module 200 may be rotatably coupled to the bracket 100. In an embodiment of the present invention, the camera module 200 is described by taking a triple camera as an example, but is not limited thereto and may be variously changed, such as a dual camera. The camera module 200 may include a housing 210, a coupling portion 220, and an extension portion 230.

The housing 210 of the camera module 200 may form the outer appearance of the camera module. The housing 210 may include at least one hole in which at least one lens module is mounted. Components that can constitute at least one camera may be disposed in the housing 210. The housing 210 may be disposed in front of the body 102 of the bracket 100. A coupling portion 220 may be formed on an upper portion of the housing 210.

The other side of the view angle adjustment member 300 may be coupled to the coupling portion 220 of the camera module 200 so that the position of the camera module 200 is adjusted. The coupling portion 220 may face the support portion 110 of the bracket 100. The coupling portion 220 may be spaced apart from the support portion 110 of the bracket 100 by a predetermined distance. As the distance between the coupling portion 220 and the support portion 110 of the bracket 100 increases, the distance between the upper portion of the camera module 200 and the upper portion of the bracket 100 may increase. When the distance between the coupling portion 220 and the support portion 110 of the bracket 100 is increased, the distance between the lower portion of the camera module 200 and the lower portion of the bracket 100 may be narrowed. When the distance between the coupling portion 220 and the support portion 110 of the bracket 100 is increased, the gap between the upper portion of the camera module 200 and the upper portion of the bracket 100 may be larger than the gap between the lower portion of the camera module 200 and the lower portion of the bracket 100. The other side of the view angle adjustment member 300 may be screw-coupled to the coupling portion 220. A thread 312 of the body 310 of the view angle adjustment member 300 may be screw-coupled to the coupling portion 220. The distance between the coupling portion 220 and the support portion 110 may be adjusted through the length of the main body 310 which is screw-coupled to the coupling portion 220. That is, the rotation angle of the camera module 200 with respect to the bracket 100 may be adjusted through the length at which the coupling portion 220 of the camera module 200 and the view angle adjustment member 300 are screw-coupled. The coupling portion 220 of the camera module 200 may include a second groove 222.

A loosening prevention portion 500 may be disposed in the second groove 222 of the coupling portion 220 of the camera module 200. The inside of the second groove 222 of the coupling portion 220 of the camera module 200 may be penetrated by the body 310 of the view angle adjustment member 300.

The extension portion 230 of the camera module 200 may be formed in the housing 210. The extension portion 230 may be extended from both ends of the housing 210. The extension portion 230 of the camera module 200 may be hinge-coupled to the extension portion 104 of the bracket 100. Through this, the camera module 200 may rotate with respect to the bracket 100. In one embodiment of the present invention, the extension portion 230 of the camera module 200 is described as an example that is formed by being extended from both ends of the housing 210 to one side or rearward, but is not limited thereto, and is formed by being extended forward from both ends of the housing 210 or may be formed by being extended toward the outer circumferential direction.

The camera angle adjustment device 10 may include a view angle adjustment member 300. One side of the view angle adjustment member 300 may be disposed on the bracket 100. The other side of the view angle adjustment member 300 may be coupled to the camera module 200 so that the position of the camera module 200 is adjusted. The other side of the view angle adjustment member 300 may be screw-coupled to the camera module 200. The length at which the view angle adjustment member 300 and the camera module 200 are screw-coupled together and the rotation angle of the camera module 200 with respect to the bracket 100 may correspond to each other. The view angle adjustment member 300 may include a body 310, an end portion 320, and a locking portion 330.

The body 310 of the view angle adjustment member 300 may be formed in a cylindrical shape. An end portion 320 may be disposed at an end of one side of the body 310. A thread 312 may be formed on the outer circumferential surface of the other side of the body 310. A locking portion 330 may be disposed between the end portion 320 and the region where the thread 312 is formed. A region in which the thread 312 is formed among the body 310 of the view angle adjustment member 300 may be screw-coupled to the coupling portion 220 of the camera module 200. The region in which the thread 312 is not formed among the body 310 of the view angle adjustment member 300 may be disposed in the first opening 1122 of the first sidewall 112 of the support portion 110 of the bracket 100. A first region of the elastic member 400 may be disposed in a region disposed between the end portion 320 and the locking portion 330 of the body 310 of the view angle adjustment member 300. A region disposed between the end portion 320 and the locking portion 330 of the body 310 of the view angle adjustment member 300 may be disposed in the support portion 110 of the bracket 100.

The end portion 320 of the view angle adjustment member 300 may be formed by being extended from the body 310 in the outer circumferential direction. The end portion 320 may be formed in a disk shape. The end portion 320 may be disposed at an end of one side of the view angle adjustment member 300. The end portion 320 may be disposed spaced apart from the locking portion 330. A locking groove 322 may be formed on an outer surface or a rear surface of the end portion 320. The end portion 320 of the view angle adjustment member 300 may be disposed in the support portion 110 of the bracket 100. The end portion 320 of the view angle adjustment member 300 may be disposed between the first opening 1122 and the second opening 1142. The end portion 320 of the view angle adjustment member 300 may be disposed between the first region 410 and the second region 420 of the elastic member 400. The end portion 320 of the view angle adjustment member 300 may be disposed between the third opening 412 and the fourth opening 422 of the elastic member 400. The outer surface or rear surface of the end portion 320 of the view angle adjustment member 300 may be exposed to the outside through the fourth opening 422 of the elastic member 400 and the second opening 1142 of the second sidewall 114.

The locking portion 330 of the view angle adjustment member 300 may be formed by being extended from the body 310 in the outer circumferential direction. The locking portion 330 may be disposed between the end portion 320 and a region of the body 310 where a thread is formed. The locking portion 330 may be spaced apart from the end portion 320 by a predetermined distance. The locking portion 330 may be formed in a disk shape. One surface of the locking portion 330 may be formed in a curved shape. The locking portion 330 may be disposed between the inner side of the first sidewall 112 of the support portion 110 of the bracket 100 and the first region 410 of the elastic member 400. One surface of the locking portion 330 formed in a curved shape may face the inner side surface of the first sidewall 112 of the support portion 110 of the bracket 100. At least a portion of one surface of the locking portion 330 may be disposed in the first opening 1122 of the first sidewall 112. The locking portion 330 may be in contact with the first groove 1124 of the first sidewall 112. The radius of the locking portion 330 may be larger than the radius of the first groove 1124.

In one embodiment of the present invention, one side of the view angle adjustment member 300 refers to a region in the direction of the end portion 320 of the view angle adjustment member 300, and the other side can be interpreted as meaning a region in the opposite direction of the end portion 320 with respect to the body 310.

The camera angle adjusting device 10 may include an elastic member 400. The elastic member 400 may be disposed on the bracket 100. The elastic member 400 may be disposed in the support portion 110 of the bracket 100. The elastic member 400 may contact one side of the view angle adjustment member 300 and the bracket 100. The elastic member 400 may be in contact with and elastically support the other surface of the locking portion 330 of the view angle adjustment member 300, so that one surface of the locking portion 330 of the view angle adjustment member 300 can be in constant contact with the first sidewall 112. At least a portion of the elastic member 400 may be bent. The bent region of the elastic member 400 may be in contact with the bottom surface of the support portion 110 or may be disposed adjacent to the bottom surface. A region among the elastic member 400 that is not bent may be exposed to the outside. The elastic member 400 may be formed in the shape of a letter 'U'. The cross section of the elastic member 400 may be formed in the shape of a letter 'U' or 'V'. The elastic member 400 may be formed of a material having elasticity. The elastic member 400 may be formed of a metal material. The elastic member 400 may include a first region 410 and a second region 420.

The first region 410 of the elastic member 400 may be disposed in a region between the end portion 320 of the view angle adjustment member 300 and the locking portion 330. The first region 410 may be in contact with one side of the locking portion 320 of the view angle adjustment member 300 to elastically support the view angle adjustment member 300. The first region 410 may be in line contact with one side of the locking portion 320 of the view angle adjustment member 300. Through this, the other side of the locking portion 320 of the view angle adjustment member 300 is brought into contact with the first sidewall 112 of the bracket 100, or may fix the view angle adjustment member 300 in a constant position with respect to the bracket 100. The first region 410 may include a third opening 412.

The third opening 412 of the first region 410 may correspond to the first opening 1122 of the first sidewall 112. The third opening 412 of the first region 410 may face the first opening 1122 of the first sidewall 112. The third opening 412 of the first region 410 may be formed to have a size corresponding to the first opening 1122 of the first sidewall 112.

The second region 420 of the elastic member 400 may be disposed between the end portion 320 of the view angle adjustment member 300 and the inner side surface of the second sidewall 114 of the bracket 300. The second region 420 may be disposed between the protrusions 1144 and 1146 and the bottom surface of the support portion 110. The second region 420 may be supported by one surface or an inner side surface of the second sidewall 114 of the support portion 110 of the bracket 100. The second region 420 may be formed by being bent in the first region 410. The second region 420 may include a fourth opening 422.

The fourth opening 422 of the second region 420 may correspond to the second opening 1142 of the second sidewall 114. The fourth opening 422 of the second region 420 may face the second opening 1142 of the second sidewall 114. The fourth opening 422 of the second region 420 may be formed to have a size corresponding to the second opening 1142 of the second sidewall 114.

The camera angle adjustment device 10 may include a loosening prevention portion 500. The loosening prevention portion 500 may be disposed in the second groove 222 of the coupling portion 220 of the camera module 200. The loosening prevention portion 500 may be penetrated by the body 310 of the view angle adjustment member 300. In one embodiment of the present invention, the loosening prevention portion 500 may mean a locknut. The loosening prevention portion 500 may perform a function of preventing loosening of the view angle adjustment member 300 screw-coupled to the coupling portion 200.

Figure 11:
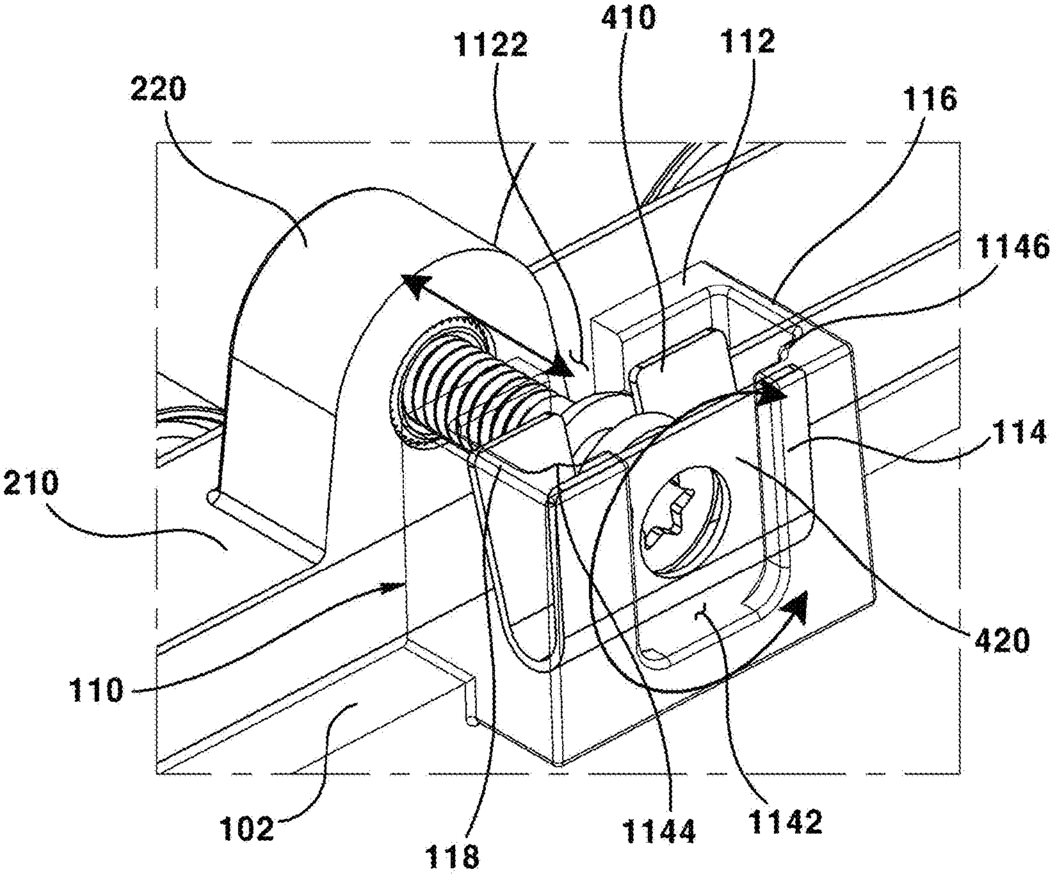
FIGS. 11 and 12 are operational diagrams of a camera angle adjustment device according to an embodiment of the present invention.
Figure 12:
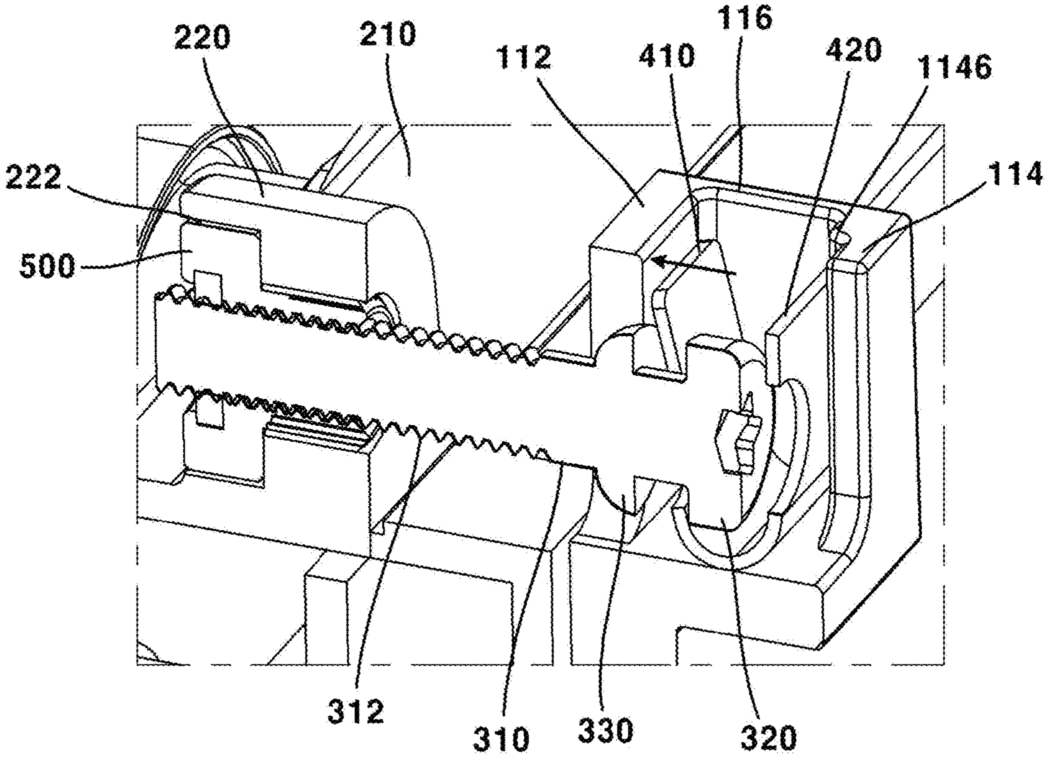

FIGS. 11 and 12 are operational diagrams of a camera angle adjustment device according to an embodiment of the present invention.

Referring to FIGS. 11 and 12, when a user turns the tool groove 222 of the view angle adjustment member 300, the view angle adjustment member 300 screw-coupled to the coupling portion 220 of the camera module 200 rotates in one direction and adjusts the length of screw-coupling. Through this, by adjusting the separation distance between the upper portion of the camera module 200 and the upper portion of the bracket 100, it is possible to adjust the rotation angle of the camera module 200 with respect to the bracket 100. Therefore, it is possible to provide an optimum view angle of the camera module 200.

Figure 13:
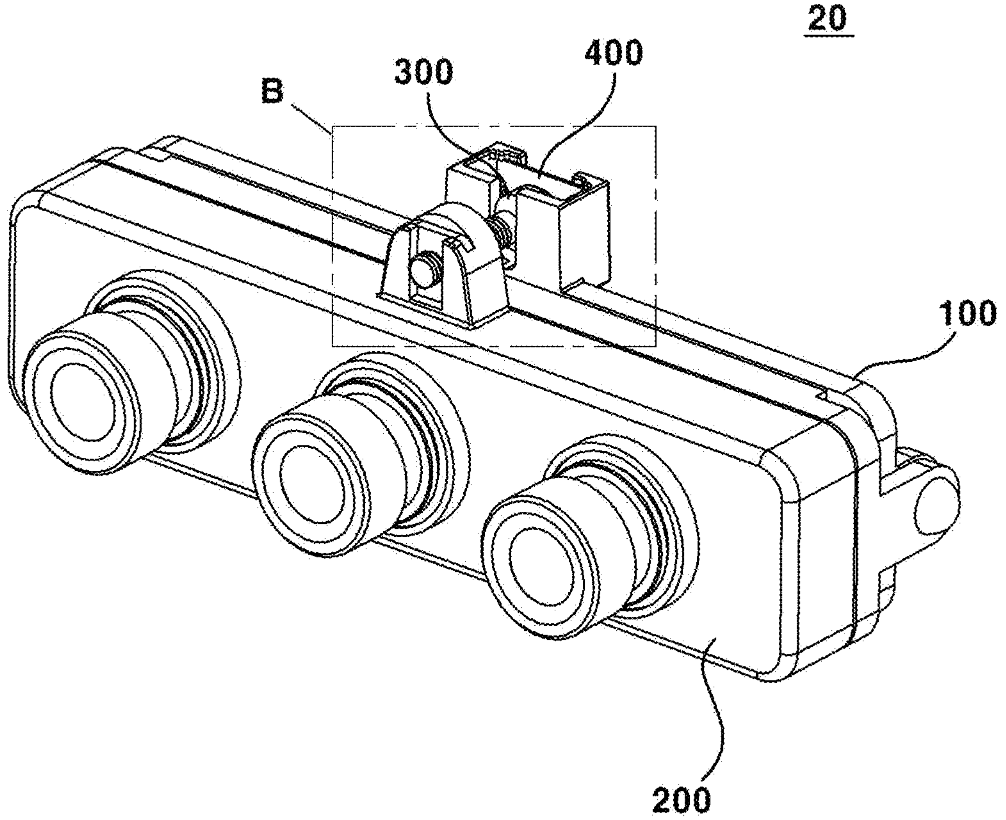
FIG. 13 is a perspective view of a camera angle adjustment device according to another embodiment of the present invention.
Figure 14:
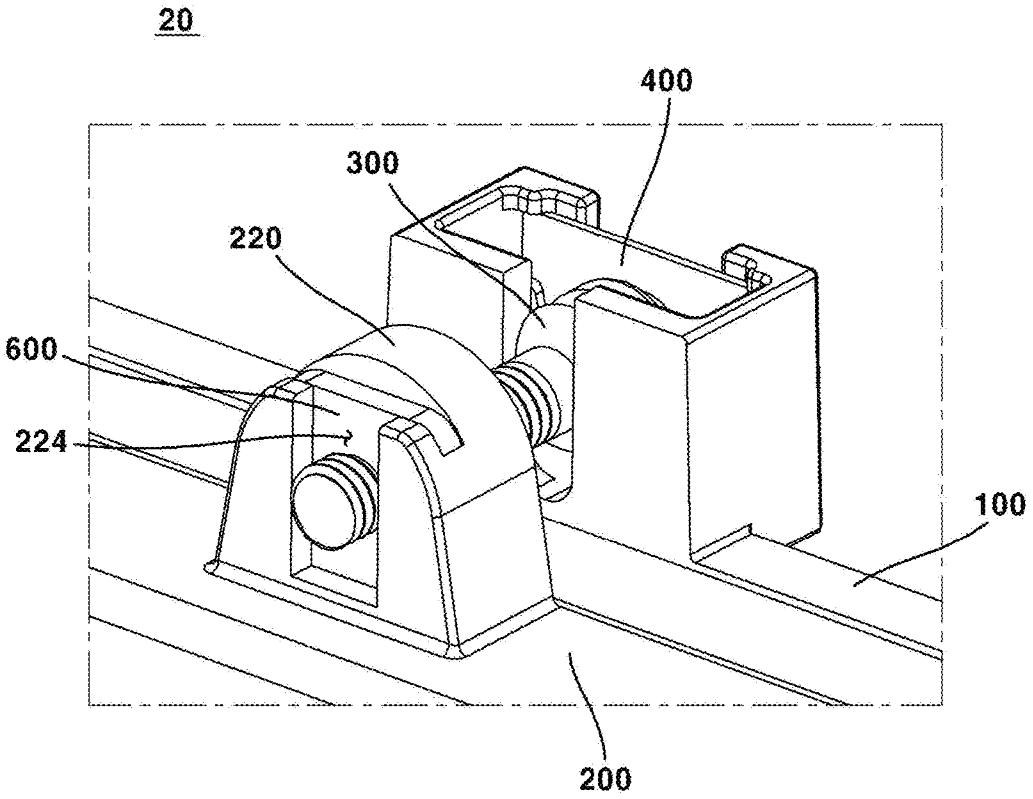
FIG. 14 is an enlarged view of part B of FIG. 13.

FIG. 13 is a perspective view of a camera angle adjustment device according to another embodiment of the present invention. FIG. 14 is an enlarged view of part B of FIG. 13.

Referring to FIGS. 13 and 14, a camera angle adjustment device 20 according to another embodiment of the present invention may include a bracket 100, a camera module 200, a view angle adjustment member 300, and an elastic member 400, and a loosening prevention portion 600, but may be implemented except for some of the configurations, and additional configurations are not excluded.

Hereinafter, among the camera angle adjustment device 20 according to another embodiment of the present invention, differences from the camera angle adjustment device 10 according to an embodiment of the present invention will be described. In addition, the configuration of the camera angle adjustment device 20 according to another embodiment of the present invention can be understood to be the same as the configuration of the camera angle adjustment device 10 according to an embodiment of the present invention.

A front portion or the other side of the coupling portion 220 of the camera module 200 may include a groove 224 in which a loosening prevention portion 600 is disposed. A portion of the groove 224 of the coupling portion 220 may be formed on the front or the other side of the coupling portion 220 and another portion may be spaced apart from the front or the other side of the coupling portion 220. The groove 224 of the coupling portion 220 may be formed to be extended in a vertical direction. The groove 224 of the coupling portion 220 may be formed in a '凸' shape.

The loosening prevention portion 600 may be disposed in the groove 224 of the coupling portion 220 of the camera module 200. The loosening prevention portion 600 may be inserted into the groove 224 of the coupling portion 200 from above. The loosening prevention portion 600 may include a hole penetrated by the thread 312 of the body 310 of the view angle adjustment member 300. The loosening prevention portion 600 according to another embodiment of the present invention may perform the same function as the loosening prevention portion 500 according to an embodiment of the present invention. That is, the loosening prevention portion 600 may prevent loosening of the view angle adjustment member 300 screw-coupled to the coupling portion 220.

FIGS. 15 to 19 are diagrams illustrating a manufacturing process of a camera angle adjustment device according to another embodiment of the present invention.

Hereinafter, a manufacturing process of the camera angle adjustment device 20 according to another embodiment of the present invention will be described.

Figure 15:
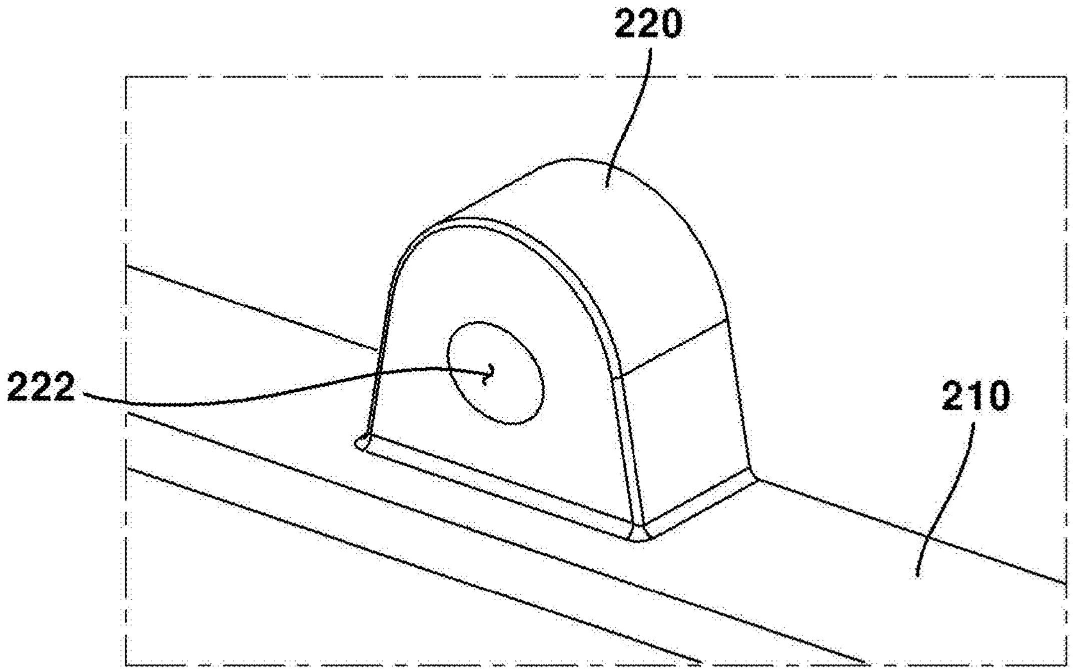
FIGS. 15 to 19 are diagrams illustrating a manufacturing process of a camera angle adjustment device according to another embodiment of the present invention.

Referring to FIG. 15, a hole 222 is drilled in the coupling portion 220 of the cast camera module 200. At this time, the diameter of the hole 222 of the coupling portion 220 may be processed to correspond to the diameter of the body 102 of the view angle adjustment member 300.

Figure 16:
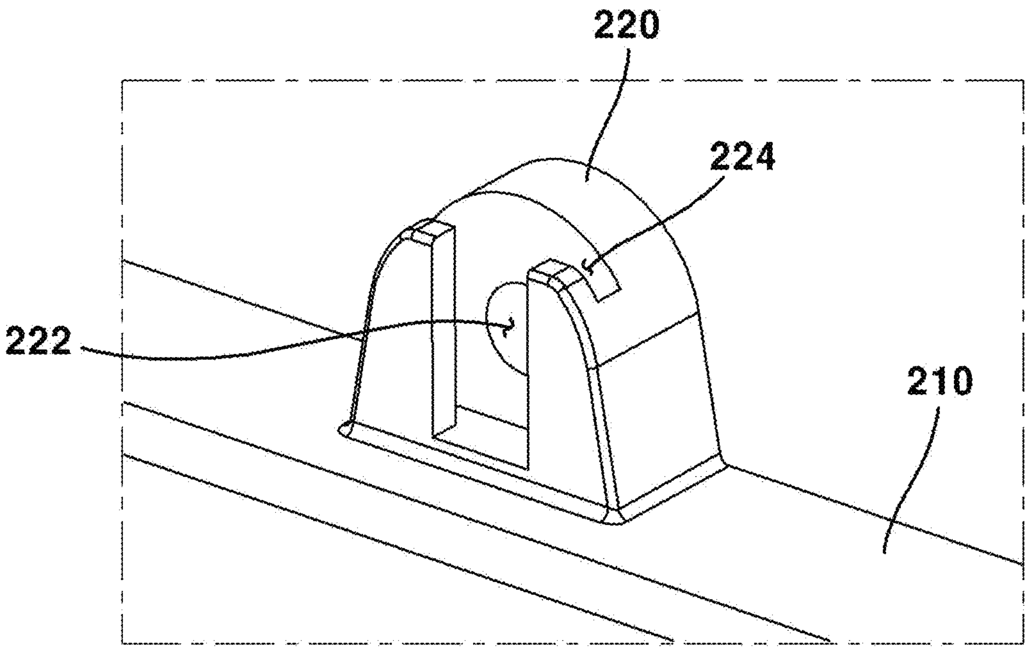

Referring to FIG. 16, the thread of the hole 222 of the coupling portion 220 and the groove 224 are processed. The thread of the hole 222 of the coupling portion 220 may be processed to correspond to the thread 312 of the body 310 of the view angle adjustment member 300. A portion of the groove 224 of the coupling portion 220 may be formed on the front surface or the other side of the coupling portion 220 and another portion may be spaced apart from the front surface or the other side of the coupling portion 220. The groove 224 of the coupling portion 220 may be formed in a '凸' shape. In this case, the groove 224 of the coupling portion 220 may be processed through a 凸 shaped processing device.

Figure 17:
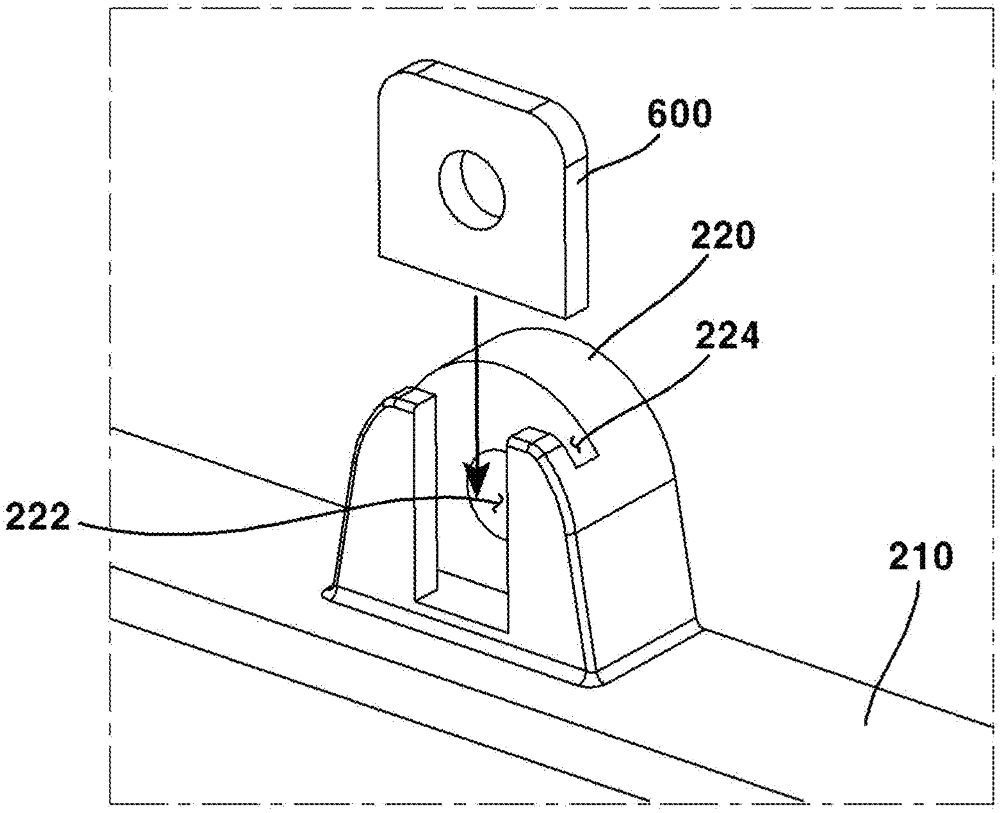
Figure 18:
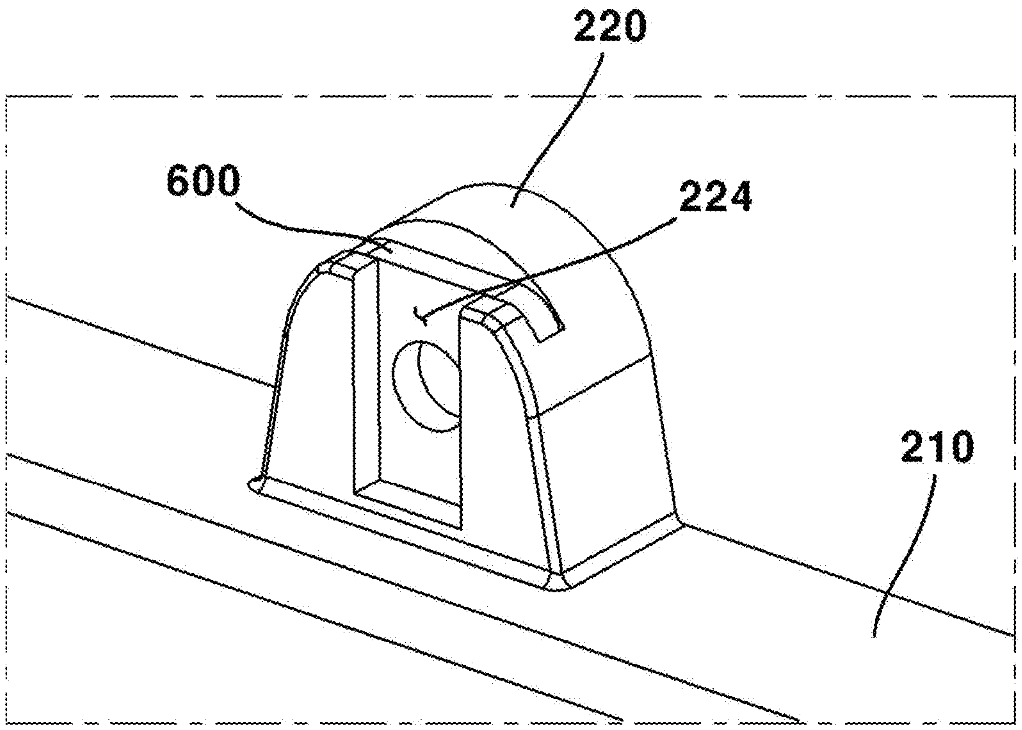

Referring to FIGS. 17 and 18, a loosening prevention portion 600 may be inserted into the hole 222 of the machined coupling portion 220 in a top-down direction. In this case, the groove of the loosening prevention portion 600 may be disposed at a position corresponding to the hole 222 of the coupling portion 220 of the camera module 200. In another embodiment of the present invention, the loosening prevention portion 600 is described as an example of a donut shape, but is not limited thereto and may be variously modified, such as a rectangular plate of the loosening prevention portion 600.

Figure 19:
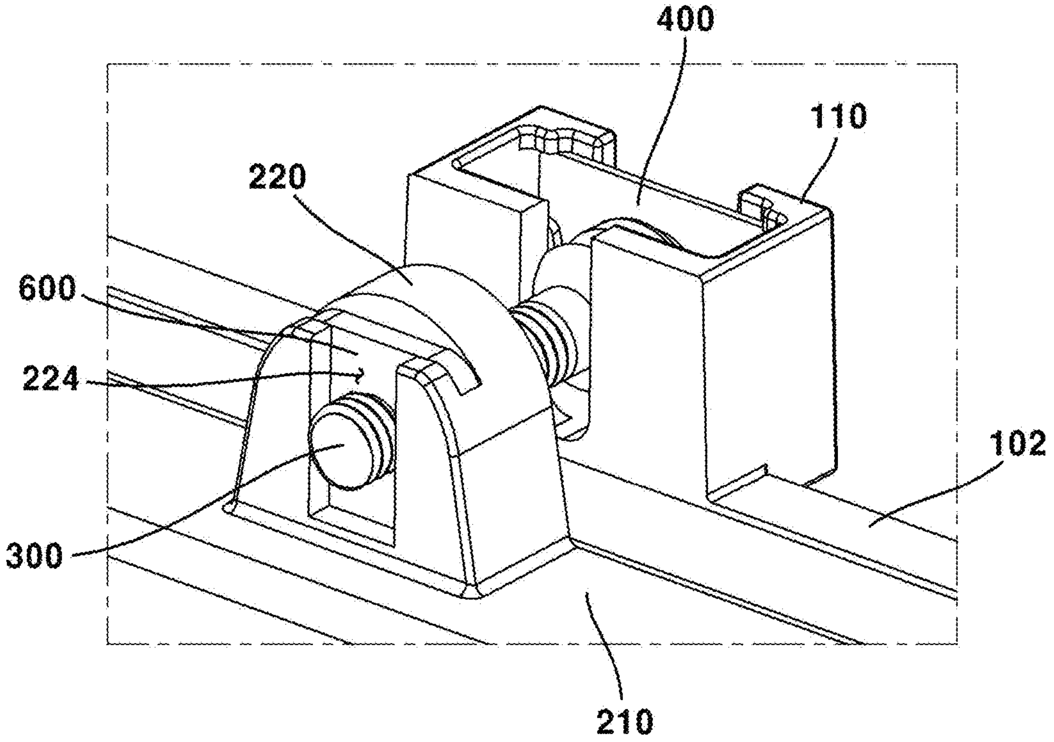

Referring to FIG. 19, the elastic member 400 is disposed on the support portion 110 of the bracket 100, and the view angle adjustment member 300 is disposed on the elastic member 400 and the support portion 110. Thereafter, by screw-coupling the view angle adjustment member 300 to the coupling portion 220 of the camera module 200, the view angle of the camera module 200 with respect to the bracket 100 may be adjusted.

Figure 20:
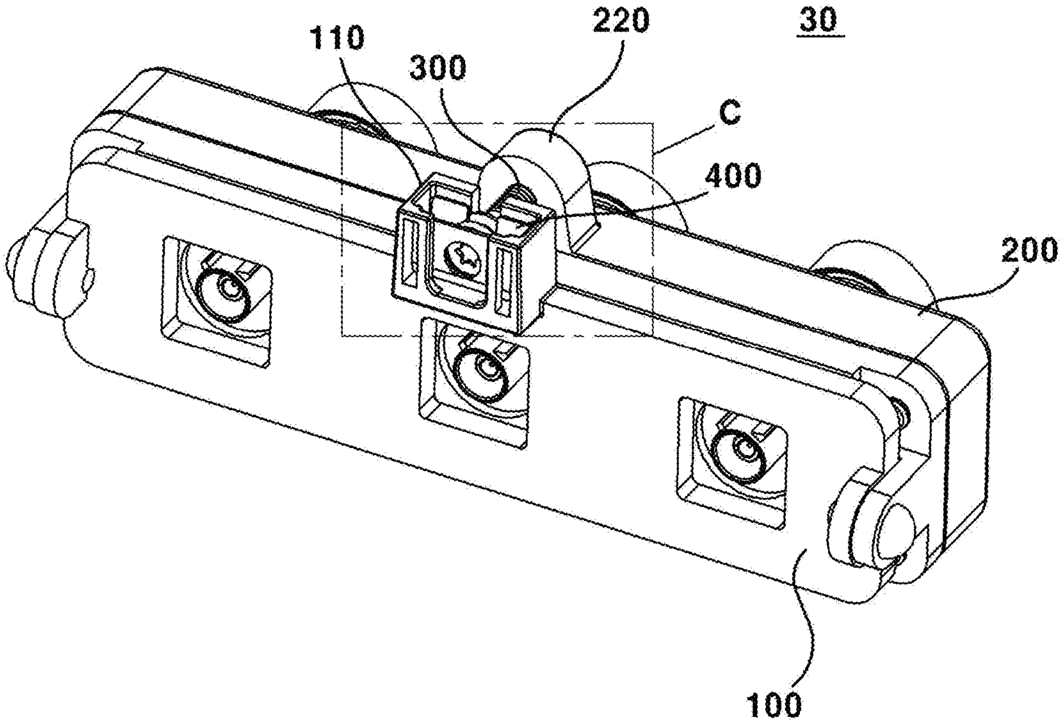
FIG. 20 is a perspective view of a camera angle adjustment device according to another embodiment of the present invention.
Figure 21:
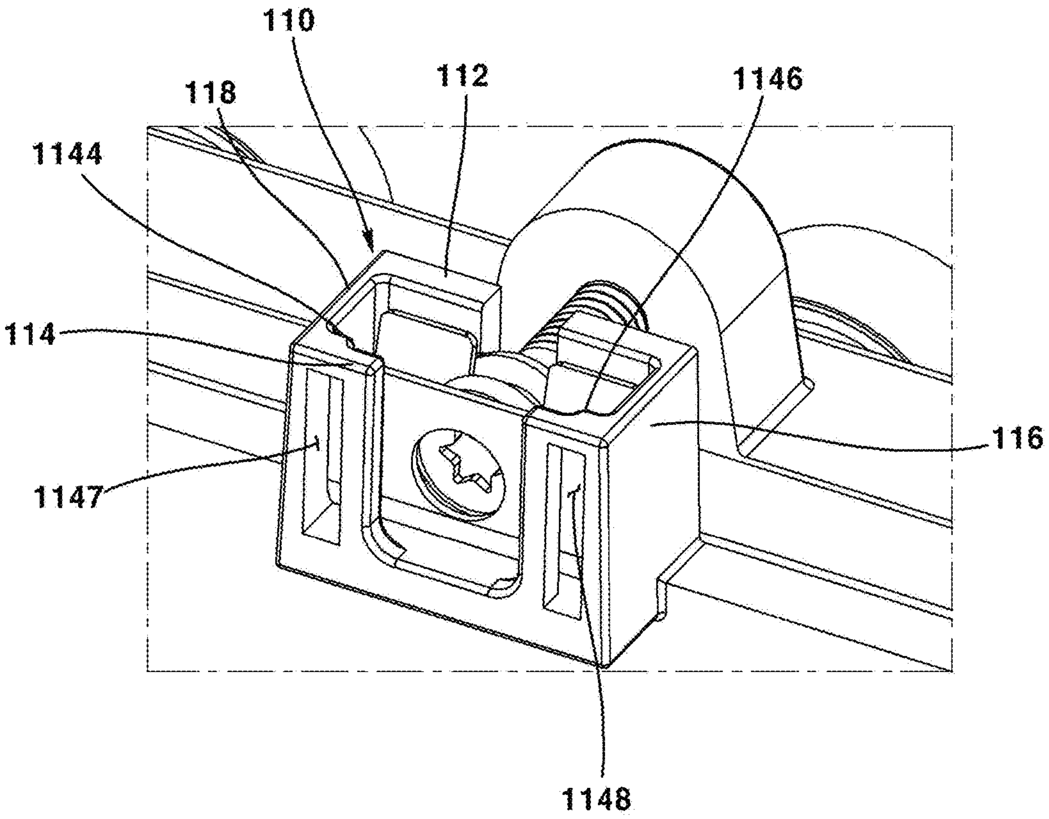
FIG. 21 is an enlarged view of part C of FIG. 20.
Figure 22:
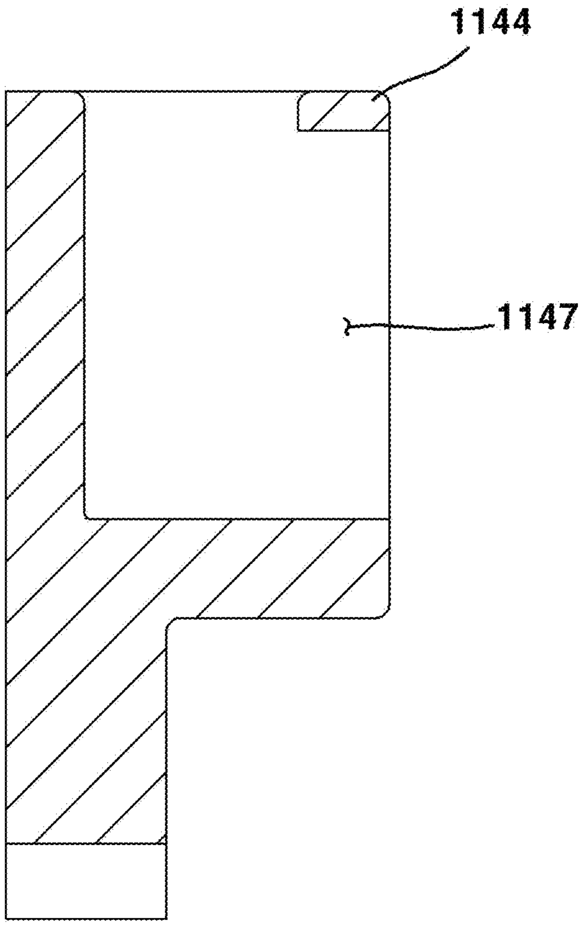
FIG. 22 is a cross-sectional view of a partial configuration of a camera angle adjustment device according to another embodiment of the present invention.

FIG. 20 is a perspective view of a camera angle adjustment device according to another embodiment of the present invention. FIG. 21 is an enlarged view of part C of FIG. 20. FIG. 22 is a cross-sectional view of a partial configuration of a camera angle adjustment device according to another embodiment of the present invention.

Referring to FIGS. 20 and 21, the camera adjustment device 30 according to another embodiment of the present invention may include a bracket 100, a camera module 200, a view angle adjustment member 300, an elastic member 400, and a loosening prevention portion 500, but may be implemented excluding some of the configurations, and additional configurations are not excluded.

Hereinafter, among the camera angle adjustment device 30 according to another embodiment of the present invention, differences from the camera angle adjustment device 10 according to an embodiment of the present invention will be described. In addition, the configuration of the camera angle adjustment device 30 according to another embodiment of the present invention can be understood to be the same as the configuration of the camera angle adjustment device 10 according to an embodiment of the present invention.

The second sidewall 114 of the support portion 110 of the bracket 100 may include grooves 1147 and 1148. The grooves 1147 and 1148 may include two grooves 1147 and 1148. The grooves 1142 and 1144 may be formed to be spaced apart from the second opening 1142. One of the two grooves 1147 and 1148 is formed in the central region of the second sidewall 114 located on one side of the second opening 1142, and the other may be formed in a central region of the second sidewall 114 located on the other side of the second opening 1142. The grooves 1147 and 1148 may not be overlapped with the protrusions 1144 and 1146. Through the grooves 1147 and 1148, the protrusions 1144 and 1146 can be easily molded.

Figure 23:
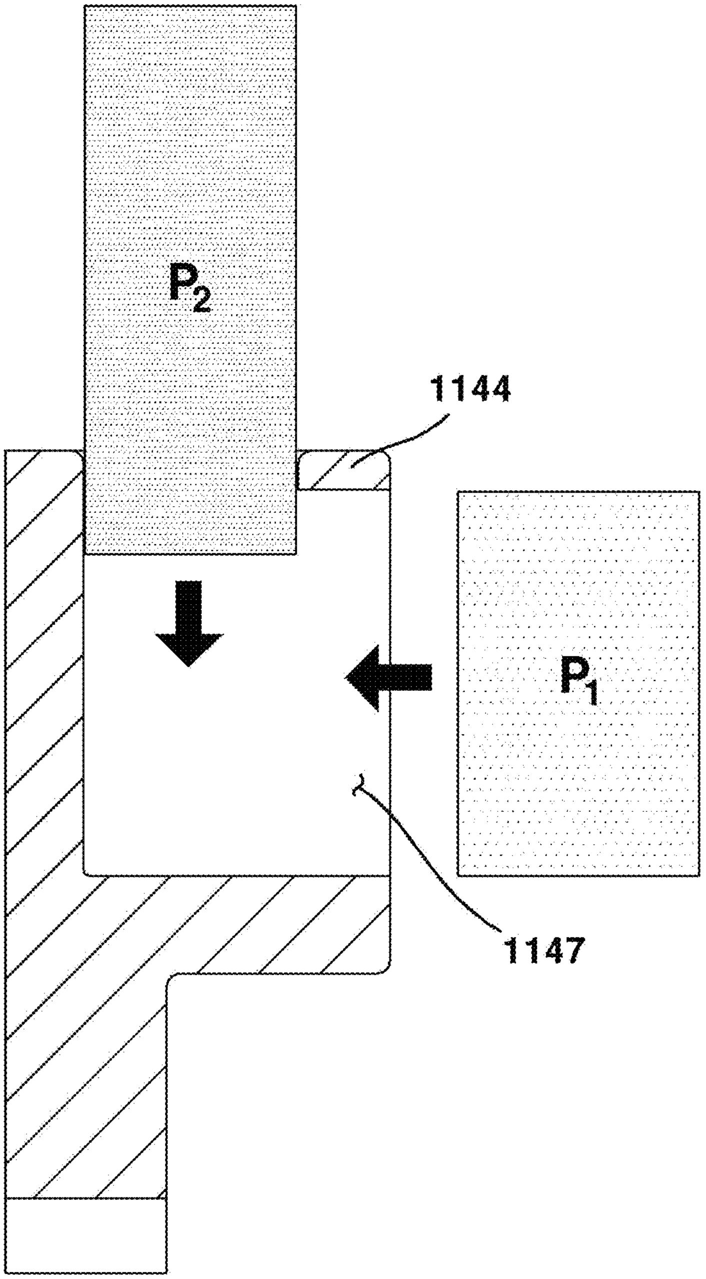
FIGS. 23 and 24 are views showing a manufacturing process of a camera angle adjustment device according to another embodiment of the present invention.
Figure 24:
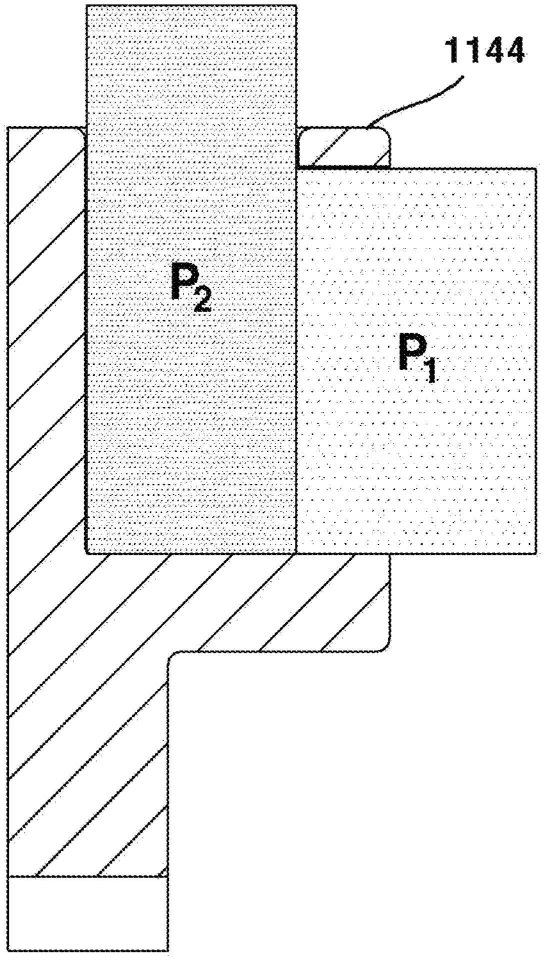

FIGS. 23 and 24 are views showing a manufacturing process of a camera angle adjustment device according to another embodiment of the present invention.

Referring to FIGS. 23 and 24, a process of forming the projections 1144 and 1146 of the camera angle adjustment device 30 according to another embodiment of the present invention will be described.

Referring to FIGS. 23 and 24, the first punch P1 enters the second sidewall 114 in a horizontal direction from the outside of the second sidewall 114, and the second punch P2 enters in a vertical direction from above of the support portion 110 toward the bottom surface of the support portion 110. At this time, after the second punch P2 enters first, the first punch P1 may enter. Conversely, after the first punch P1 enters first, the second punch P2 may enter. Through this, detailed configurations of the support portion 110 of the bracket 100 can be easily manufactured.

The embodiments of the present invention have been described above with reference to the accompanying drawings, but a person skilled in the art to which the present invention belongs may understand that the present invention can be implemented in other specific forms without changing the technical spirit or essential features. Therefore, it should be understood that the embodiments described above are illustrative and non-limiting in all respects.

What is claimed is:

1. A camera device comprising:

a bracket;

a camera module coupled to the bracket so as to be rotatable about a first axis;

a view angle adjustment member comprising a first portion coupled to the bracket and a second portion coupled to the camera module; and a support member located on the bracket to contact the first portion of the view angle adjustment member with the bracket, wherein the view angle adjustment member comprises a body, a thread in the second portion of the body, and a locking portion protruding from the first portion of the body.

2. The camera device according to claim 1, wherein a first surface of the locking portion is in contact with the support member in a first direction, and a second surface of the locking portion which is opposite to the first surface is in contact with the bracket.

3. The camera device according to claim 2, wherein the support member is in contact with the first surface of the locking portion of the view angle adjustment member to elastically support the view angle adjustment member.

4. The camera device according to claim 3, wherein the support member is in line contact with the first surface of the locking portion of the view angle adjustment member to fix the view angle adjustment member in a predetermined position with respect to the bracket.

5. The camera device according to claim 1, wherein the bracket comprises a support portion on which the support member is located, and wherein the support portion comprises a first sidewall located between the camera module and the first portion of the view angle adjustment member.

6. The camera device according to claim 5, wherein the first sidewall comprises a first opening in which a portion of the view angle adjustment member is located.

7. The camera device according to claim 6, wherein the first opening has a length in a first direction longer than a length in a second direction perpendicular to the first direction.

8. The camera device according to claim 5, wherein the camera module comprises a coupling portion to which the second portion of the view angle adjustment member is coupled so that a position of the camera module is adjustable, wherein the coupling portion of the camera module and the support portion of the bracket are spaced apart, and wherein, when a distance between the coupling portion and the support portion is increased, a distance between an upper portion of the camera module and an upper portion of the bracket is greater than a distance between a lower portion of the camera module and a lower portion of the bracket.

9. The camera device according to claim 8, wherein the second portion of the view angle adjustment member is screw-coupled to the coupling portion.

10. The camera device according to claim 9, wherein a length at which the view angle adjustment member and the camera module are screw-coupled, and a rotation angle of the camera module with respect to the bracket are corresponding to each other.

11. The camera device according to claim 8, wherein the coupling portion of the camera module comprises a second groove.

12. The camera device according to claim 11, further comprising a loosening prevention portion located in the second groove and penetrated by the body of the view angle adjustment member.

13. The camera device according to claim 5, wherein the second surface of the locking portion of the view angle adjustment member has a curved shape, and wherein the first sidewall of the support portion comprises a first groove having a curved shape corresponding to the curved shape of the second surface of the locking portion.

14. The camera device according to claim 1, wherein the camera module comprises a housing and extension portions extended from opposite ends of the housing, and wherein each extension portion is hinge-coupled to the bracket.

* * * * *